(12) United States Patent
Pages et al.

(10) Patent No.: US 7,448,415 B2
(45) Date of Patent: Nov. 11, 2008

(54) CAM MOTION MACHINE, METHOD OF ASSEMBLY OF SUCH A MACHINE AND WEAVING LOOM IN WHICH SUCH A MACHINE IS INSTALLED

(75) Inventors: Jean-Pierre Pages, Faverges (FR); Bastien Tardy, Annecy (FR)

(73) Assignee: Staubli Faverges, Faverges (FR)

( * ) Notice: Subject to any disclaimer, the term of this patent is extended or adjusted under 35 U.S.C. 154(b) by 0 days.

(21) Appl. No.: 11/400,204

(22) Filed: Apr. 10, 2006

(65) Prior Publication Data
US 2006/0231152 A1 Oct. 19, 2006

(30) Foreign Application Priority Data
Apr. 15, 2005 (FR) .................................. 05 03787

(51) Int. Cl.
*D03C 5/00* (2006.01)
*D03C 5/04* (2006.01)
*D03C 1/00* (2006.01)

(52) U.S. Cl. ............................. 139/79; 139/80; 139/81

(58) Field of Classification Search ............... 139/66 R, 139/66 A, 67–77, 79–81
See application file for complete search history.

(56) References Cited

U.S. PATENT DOCUMENTS

| | | | | | |
|---|---|---|---|---|---|
| 1,256,644 | A | * | 2/1918 | Barlow | 139/66 R |
| 3,180,366 | A | * | 4/1965 | Hoenig | 139/66 R |
| 3,468,347 | A | * | 9/1969 | Fumat | 139/66 R |
| 3,804,128 | A | | 11/1972 | Amigues | |
| 3,724,510 | A | * | 4/1973 | Kleiner | 139/66 R |
| 3,730,231 | A | * | 5/1973 | Hoenig | 139/66 R |
| 4,230,210 | A | * | 10/1980 | Hintsch | 192/28 |
| 4,298,031 | A | * | 11/1981 | Genini | 139/55.1 |
| 4,315,530 | A | * | 2/1982 | Brock et al. | 139/76 |
| 4,326,563 | A | * | 4/1982 | Brock et al. | 139/76 |
| 4,336,829 | A | * | 6/1982 | Brock | 139/76 |
| 4,367,770 | A | * | 1/1983 | Schwarz | 139/66 R |
| 4,385,649 | A | * | 5/1983 | Sevcik | 139/435.3 |
| 4,422,480 | A | * | 12/1983 | Geirhos et al. | 139/66 R |
| 4,597,417 | A | * | 7/1986 | Schwarz | 139/76 |
| 4,614,211 | A | * | 9/1986 | Mettler | 139/76 |
| 4,643,231 | A | * | 2/1987 | Brock et al. | 139/66 R |
| 4,646,788 | A | * | 3/1987 | Brock et al. | 139/76 |

(Continued)

FOREIGN PATENT DOCUMENTS

GB 764462 12/1956

*Primary Examiner*—Bobby H Muromoto, Jr.
(74) *Attorney, Agent, or Firm*—Dowell & Dowell PC (57) ABSTRACT

A cam motion machine that includes several cams each defining at least one running track for a follower roller. Each cam is provided with a centering bore that permits mounting of the cam on a drive shaft, while elements are provided to apply a tightening force parallel to the drive shaft with a non-circular section. At least one washer-spacer, for which an internal edge is non-circular and designed to enable an axial displacement of the washer-spacer along the shaft, is fixed to rotate with the shaft and is in contact with at least one of the cams. The washer-spacer may be fixed to the cam by adherence and to the shaft by cooperation of shapes due to complementary projections provided on one of the shaft and the washer-spacer.

It would be appreciate if the Examiner would indicate the acceptance of this amendment to the Abstract in the next office communication.

18 Claims, 5 Drawing Sheets

U.S. PATENT DOCUMENTS

| | | | |
|---|---|---|---|
| 4,699,181 A * | 10/1987 | Surkamp | 139/76 |
| 5,070,911 A * | 12/1991 | Palau et al. | 139/71 |
| 5,107,901 A * | 4/1992 | Pages et al. | 139/76 |
| 5,209,268 A * | 5/1993 | Froment et al. | 139/66 A |
| 5,285,819 A * | 2/1994 | Froment et al. | 139/84 |
| 5,341,850 A * | 8/1994 | Froment et al. | 139/79 |
| 5,433,254 A * | 7/1995 | Pages | 139/82 |
| 5,908,050 A * | 6/1999 | Froment et al. | 139/66 R |
| 5,918,645 A * | 7/1999 | Froment et al. | 139/66 R |
| 6,938,647 B2 * | 9/2005 | Pages et al. | 139/66 R |
| 2004/0011417 A1 * | 1/2004 | Pages et al. | 139/76 |

\* cited by examiner

CAM MOTION MACHINE, METHOD OF ASSEMBLY OF SUCH A MACHINE AND WEAVING LOOM IN WHICH SUCH A MACHINE IS INSTALLED

BACKGROUND OF THE INVENTION

1. Field of the Invention

The invention relates to a cam motion machine. The invention also relates to a washer-spacer and a cam for such a machine, a weaving loom in which such a machine is installed, and a method of assembly of such a machine.

2. Brief Description of the Related Art

In the field of looms, cam motion machines are known that comprise a series of oscillating levers, with one lever for each heddle frame to be installed on the loom. Each oscillating lever is designed so that it can be coupled to one of the frames and equipped with two rollers that cooperate with the two tracks of a complementary cam driven in rotation by a shaft common to the machine. The cams must be installed on a drive shaft to which they are fixed in rotation by adherence under the effect of an axial force applied by appropriate tightening means, after these cams have been adjusted to be at specific angles with respect to each other as a function of the required machine.

Such a connection by adherence is sometimes insufficient to firmly fix the cams with respect to their drive shaft. Considering the performances required for modem cam motion machines, their rotation speeds are increasingly high to the extent that torques applied by follower rollers on the cams can offset the angle of the cams on this shaft, which causes maladjustment of the machine and lowers the manufacturing quality of the fabrics.

SUMMARY OF THE INVENTION

This invention is intended in particular to overcome these disadvantages by proposing a cam motion machine for which the cams can be fixed securely on their drive shaft.

With this in mind, the invention relates to a cam motion machine for a loom that comprises several cams each defining at least one running track for a follower roller, each cam being provided with a centring reaming on a drive shaft, while means are provided to apply a tightening force parallel to the drive shaft. This machine is characterised in that:
the section of the shaft is non-circular,
at least one washer-spacer, for which the internal edge is non-circular and designed to enable an axial displacement along the shaft and to fix the washer-spacer and the shaft in rotation, is arranged around the shaft bearing in contact with at least one of the cams.

In such a machine, the washer-spacer may be fixed in rotation by adherence with respect to the cam due to the axial tightening force, while cooperation of the internal edge of the washer-spacer and the non-circular peripheral surface of the drive shaft efficiently fixes the washer to the shaft in rotation by cooperation of shapes.

According to advantageous but non-compulsory aspects of the invention, such a machine may incorporate one or several of the following characteristics, taken in any technically acceptable combination:

The washer-spacer is compressed between two cams under the effect of the tightening force.

One of the cams on which the washer-spacer bears is provided with a recess in which this washer-spacer fits, on at least one of its side faces perpendicular to its running track(s). In this case, each cam may be provided with a recess, while a washer-spacer engaged around the shaft is placed in each recess. An assembly formed from a washer-spacer and the cam in the recess in which this washer is located may be 12 mm thick. Furthermore, the face of the washer-spacer in position in the recess preferably extends to a distance of 6 mm from a median plane of the cam.

Each washer-spacer is provided with a center bore or reaming that is at least partly circular, while a section of the drive shaft is inscribed within a circular envelope with a radius slightly less than a radius of the central bore or reaming of the cams, which enables an adjustment of the angular position of the cams with respect to the shaft. In this case, the drive shaft is provided with at least one area recessed with respect to this circular envelope, while the internal edge of the washer-spacer is provided with at least one projection that can engage in this recessed area. At least one edge of this projection may be approximately complementary to a bottom edge of this recessed area.

The invention also relates to a loom fitted with a cam motion machine like that described above. Such a loom is more reliable, to the extent that the angular position of its cams is fixed, even when the loom is working at high speed.

In the context of the same global inventive concept, the invention also relates to a washer-spacer of a cam motion machine for a loom, this washer being flat with a constant thickness and provided with a non-circular internal edge designed to enable axial displacement along a drive shaft of the cams of the machine, and to fix the washer-spacer in rotation with this shaft, this washer also being designed to be pushed into contact with at least one cam of the machine under the effect of a tightening force parallel to this shaft.

Still considering the overall inventive concept, the invention also relates to a cam for a cam motion machine for a loom, this cam defining at least one running track for a follower roller while being provided with a central bore or reaming which permits mounting of the cam on a drive shaft. This cam is provided with a recess that runs along an edge of its central bore and opens up into this bore, on at least one of its side faces perpendicular to the running track, this recess being designed to hold a washer-spacer like that mentioned above arranged around the drive shaft when the cam is mounted on this shaft.

This cam may be mounted around a drive shaft for a motion machine, while holding a washer in its recess used to effectively fix the cam and the washer in rotation by bonding and by cooperation of shapes between the washer and the drive shaft.

Advantageously, the cam is provided with a groove on at least one of its side faces perpendicular to the running track, extending globally along a diametric direction of its central reaming.

Finally, the invention relates to a method of assembly of a cam motion machine like that described above in which each cam is slid along the drive shaft until it reaches approximately its planned position along this shaft. This method includes steps consisting of:
a) placing at least one washer-spacer around the shaft close to at least one of the cams;
b) orienting each cam with respect to the drive shaft, and
c) fixing the cams in position with respect to the drive shaft and with respect to the others, by applying a tightening force of the cams and the washer-spacer(s) parallel to the shaft.

According to one advantageous aspect of this method, an additional step can be provided consisting of:

d) engaging a gauge in a groove formed on one of the side faces of at least one cam, projecting radially outwards from its running track(s), while e) during step b), each cam equipped with a groove is oriented by bringing the gauge engaged in this groove to bear in contact with a fixed stop.

This method facilitates the angular adjustment of the cams for which the position can easily be found by the operator who knows that he must bring the gauge into contact with the corresponding fixed stop. The order of steps a) and d) could be reversed.

Advantageously, when a washer-spacer is arranged between two cams, the gauge engaged in the groove in one of these cams is at a distance from the face opposite the other gauge, while when there is no washer-spacer, the gauge bears in contact with the opposite face under the effect of the tightening force. The thickness of the part of the gauge that projects axially from the groove in which it is engaged is less than the thickness of the part of the washer-spacer that projects axially from the corresponding recess or the total thickness of the washer when there is no recess. Thus, when the washer is in position, the gauge may be withdrawn at the end of the adjustment of the angular position of the cam. On the other hand, if the washer-spacer was forgotten during assembly, the gauge is clamped between two adjacent cams, which prevents or makes it very difficult to withdraw it. The operator can then immediately realise his omission.

BRIEF DESCRIPTION OF THE DPAWINGS

The invention will be better understood and other advantages will become clearer after reading the following description of two embodiments of a cam motion machine, washers-spacers, cams, a loom and methods conforming with its principle, given solely as examples and with reference to the appended figures, wherein.

DESCRIPTION OF THE PREFERRED EMBODIMENTS

Figures 1, 7:
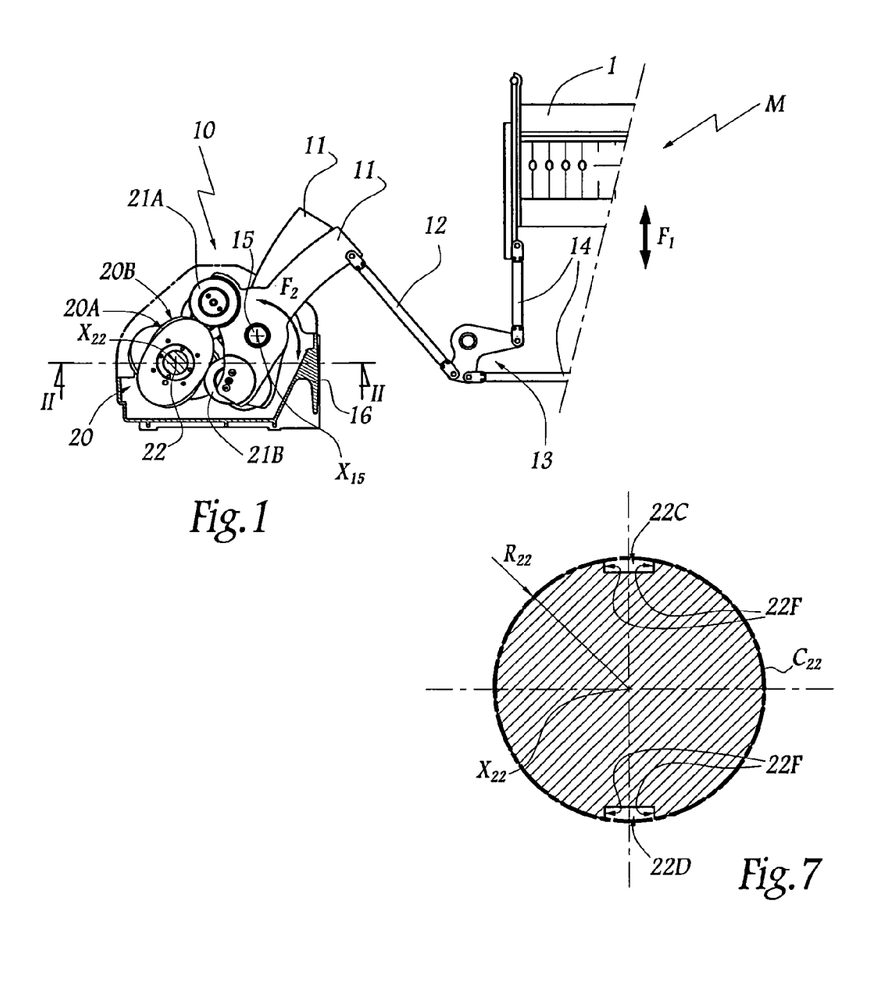
FIG. 1 is a diagrammatic partial view illustrating the principle of a loom conform with the invention, part of the machine being torn off to make the drawing more easily understandable.
FIG. 7 is a cross-sectional view at the same scale as FIG. 5, showing the shaft 22 at the line IV-IV in FIG. 2, illustrating the principle of a loom.

The loom M shown in FIG. 1 comprises several heddle frames, only one of which is shown in this Figure as reference 1. The different frames of the loom M are driven by a vertical oscillation movement represented by the double arrow $F_1$ and controlled by a cam motion machine or mechanism 10 for which the output levers 11 come into contact with the connecting rods 12 associated with the cranked levers 13 connected to each other and to the frame through connecting rods 14.

The number of levers 11 provided is the same as the number of heddle frames 1 and they are installed free to pivot as shown by the double arrow $F_2$ about the longitudinal axis $X_{15}$ of a common shaft 15 supported by the frame 16 of the machine 10. The machine 10 also comprises several complementary cams 20 each defining two tracks 20A, 20B on which rollers 21A, 21B bear supported in pairs by levers 11.

The cams 20 are mounted on a common shaft 22 that is supported by the frame 16 and for which a first end 22A supports a bevel gearwheel 23 designed to cooperate with a bevel gearwheel 24 forming a reduction gear driving the shaft 22 about its longitudinal axis $X_{22}$.

Two bearings 25A and 25B enable the frame 16 to support the shaft 22 between its end 22A and cams 20 respectively, and close to the end 22B opposite shaft 22.

The cams 20 are slid around the shaft 22, and to achieve this they are each provided with a central bore or reaming 20C with a circular section centered on an axis $X_{20}$ that will be coincident with the axis $X_{22}$ when a cam is installed on the shaft 22.

The reaming 20C can only be partially circular, in other words they can have an edge formed from several non-adjacent circular arcs.

As is particularly clear in FIG. 7, the shaft 22 has a circular section centered on its axis $X_{22}$ and provided with two longitudinal grooves 22C and 22D that extend over the length of its part 22E in which the cams 20 will be fitted. The surface of the cylindrical envelope with a circular base of the part 22E is denoted $C_{22}$ and the radius of this surface is denoted $R_{22}$. The radius of the reaming $20C_{22}$ is denoted $R_{22}$. The value of the radius $R_{20}$ is slightly greater than the radius $R_{22}$, which enables each cam 20 to slide on the part 22E of the shaft 22.

When the reaming 20C is partly circular, the radius of its parts along the arc of a circle is chosen as shown above for the radius $R_{20}$.

Figure 6:
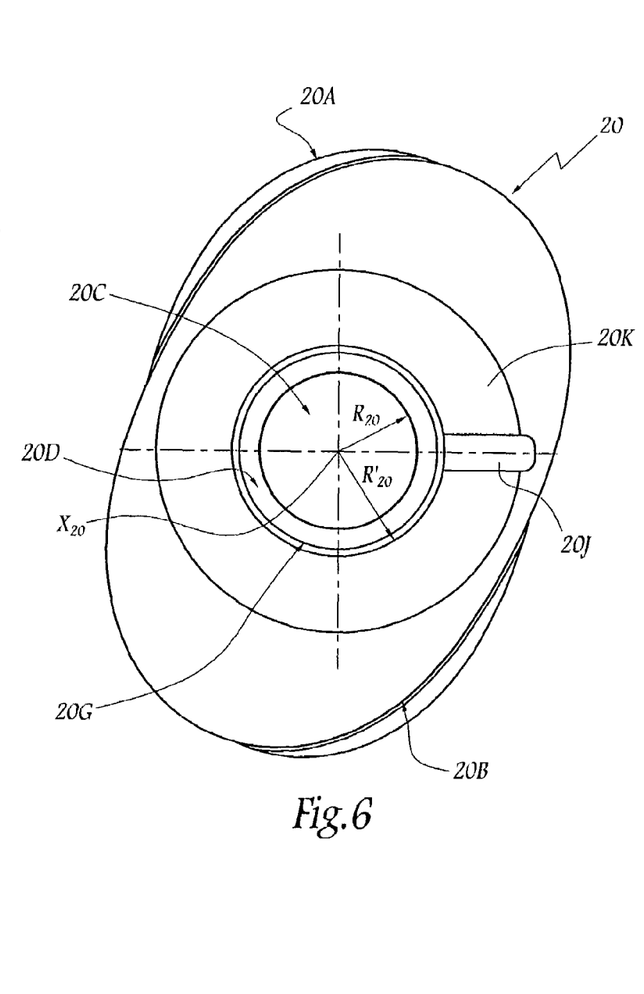
FIG. 6 is a front view of a cam according to the invention used in the machine according to the invention.

Each cam 20 is provided with a recess 20D formed on a side face 20E of the cam 20, in other words a face perpendicular to the tracks 20A and 20B. This recess is also circular and is centered on the axis $X_{20}$. Its outside radius is denoted $R'_{20}$. The recess 20D of each cam 20 opens up into the reaming 20C of this cam.

The recess 20D is provided with a clearance 20G formed as a groove adjacent to the edge 20F, close to its external peripheral edge 20F.

Figure 4:
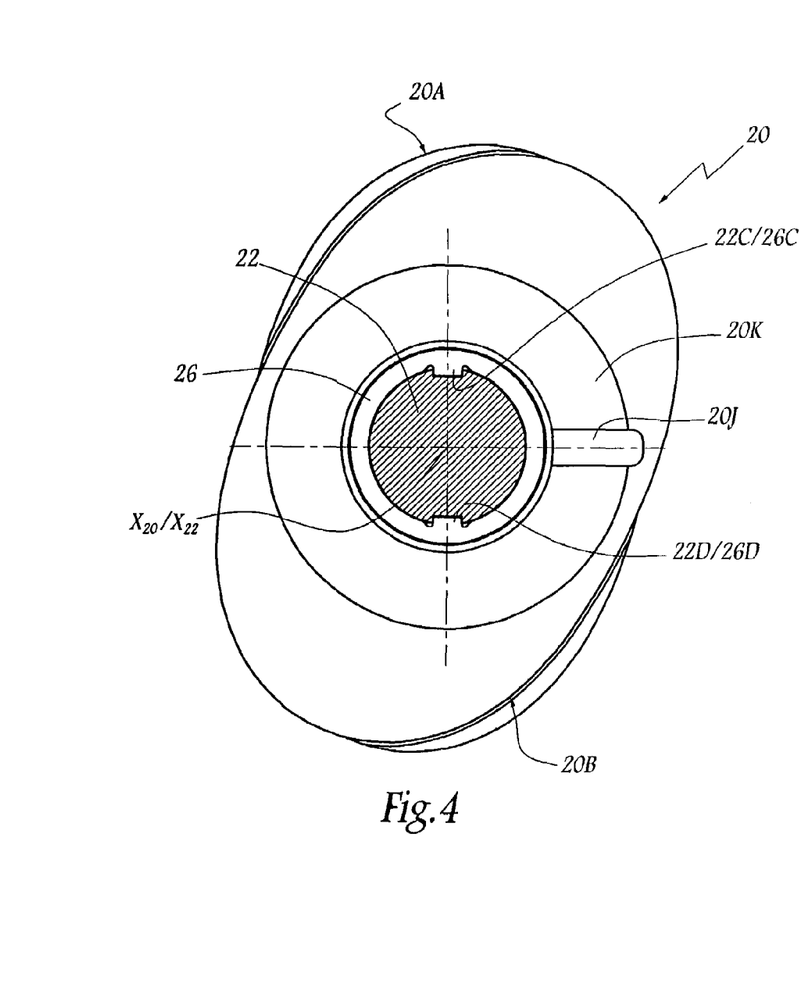
FIG. 4 is a section along line IV-IV in FIG. 2.
Figure 5:
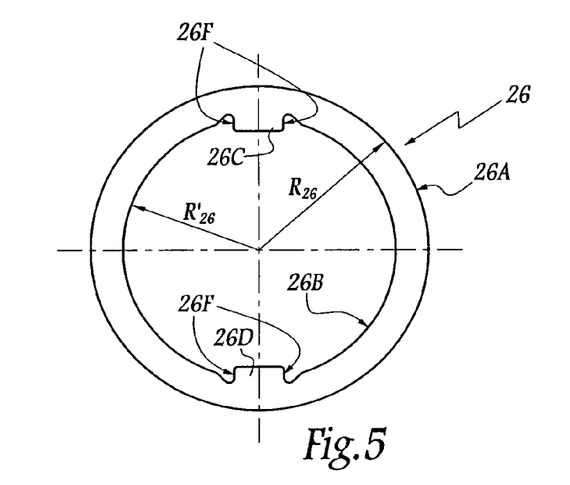
FIG. 5 shows a larger scale front view of a washer-spacer of the machine according to the invention.

A washer-spacer 26 is located in each recess 20D, and is particularly visible in FIG. 5, its external edge 26A being circular with a radius $R_{26}$ less than the radius $R'_{20}$. The internal edge 26B of the washer 26 has two circular portions with a radius $R'_{26}$ slightly larger than the radius $R_{22}$, and two teeth 26C and 26D with dimensions adapted so that they enter into grooves 22C and 22D respectively as shown in FIG. 4.

The side faces 26F of the teeth 26C and 26D are approximately complementary to the edges 22F of the grooves 22C and 22D, while the teeth 26C and 26D can slide along grooves 22C and 22D parallel to the axis $X_{22}$.

Thus, a washer 26 can be put into place in the recess 20D of a cam 20, while its teeth 26C and 26D are engaged in grooves 22C and 22D. As long as the cams are not in contact with each other, the washer 26 is free to slide in the recess 20D, while being fixed in rotation on the shaft 22 so that the angular position of the cam can be adjusted.

A torque can be transmitted from the shaft 22 to each washer 26 by cooperation between the edges 26F and the sides 22F.

As is particularly clear in FIG. 5, each washer-spacer 26 is flat and has a constant thickness.

The thickness $e_{26}$ of a washer 26 is greater than the depth $P_{20}$ of the recess 20D on which it is placed, such that when a washer 26 is located in a corresponding recess 20D, it projects from the face 20E of the cam 20 in which this recess is formed, over a non-zero width 1 that is relatively small relative to the width of the cam 20.

Figure 3:
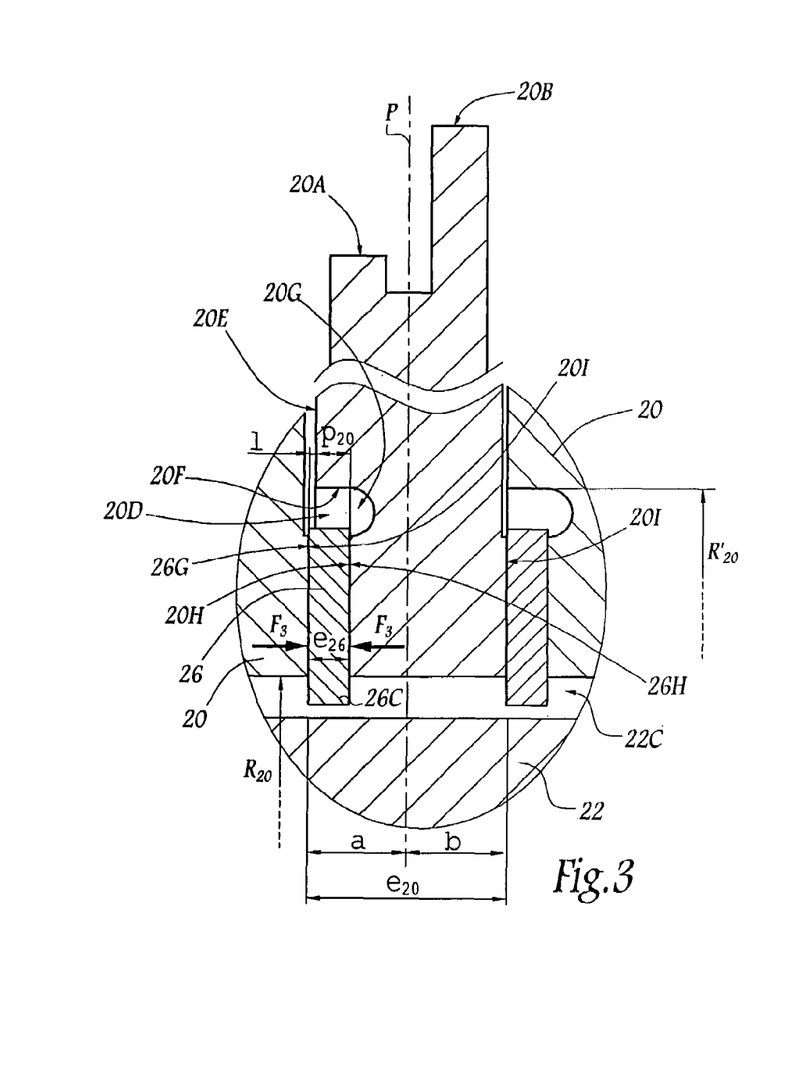
FIG. 3 is a larger scale view of detail III in FIG. 2.

Thus, the addition of a washer-spacer 26 in a recess 20D does not significantly increase the thickness of the assembly formed by the washer 26 and the associated cam 20, denoted $e_{20}$ in FIG. 3, compared with the thickness of the cam alone. In practice, the thickness of the assembly 20+26 is 12 mm. A median plane of the tracks 20A and 20B of a cam 20, in other words a plane at equal distance from these tracks, is denoted P. The side face of the washer 26 placed in the recess 20D of this cam is denoted 26G, this face 26G being opposite the bottom 20H of the recess. The face 26G is located at a distance from the plane P measured parallel to the axis $X_{22}$ equal to 6 mm. The distance b measured parallel to the $X_{22}$ axis between the plane P and the face 20I of the cam 20 opposite the recess 20D is equal to 6 mm. There is a slight over thickness of the cam 20 at the part of the face 20I facing a washer 26, which gives a clear contact between this face and the washer, with no interference with the face 20E of an adjacent cam.

Figure 2:
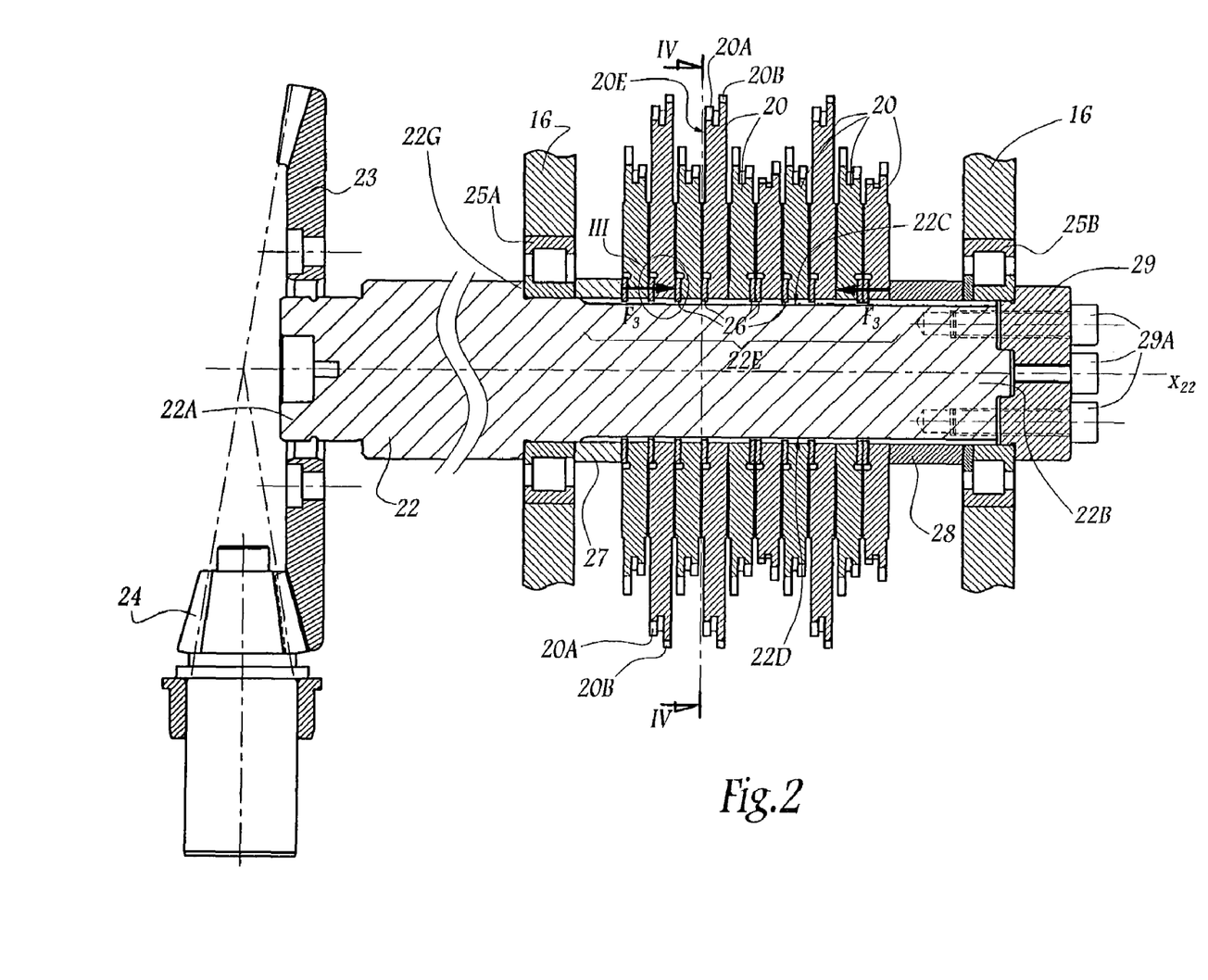
FIG. 2 is a partial section along line II-II in FIG. 1 illustrating the principle of a loom.

The value of the distances a and b and the thickness $e_{20}$ are such that the cams 20 can be turned over about their plane P, as shown by two of them in FIG. 2.

The clearance between the adjacent cams 20 in their parts that are not in contact through the washer-spacer 26 is denoted J. This clearance is equal to the distance between the faces 20E and 20I facing each other, radially outside the recess 20D.

The clearance 20G provided in each recess 20D enables a clean contact between the corresponding washer-spacer 26 with the bottom 20H of the recess, with no risk of a fillet from pushing the edge 26A of this washer.

In practice, each of the cams 20 fitted on the shaft 22 is provided with a recess 20D in which a washer-spacer 26 is placed. However, this is not compulsory and it would be possible to image a machine in which only some cams are provided with a recess and a washer.

A ring 27 is arranged around the shaft 22 between the bearing 25A and elements 20 and 26, the bearing 25A being in contact with a shoulder 22G of the shaft. Another ring 28 is placed between the elements 20 and 26 and the end 22B of the shaft 22, while a tightening device 29 is provided on this end. By tightening the screws 29A of the device 29, it is possible to apply a tightening force $F_3$ between the rings 27 and 28 parallel to the $X_{22}$ axis, in other words axial with respect to the shaft 22. As shown in FIG. 3, the effect of this axial force is to bring the washer 26 firmly into contact with the bottom 20H of the recess 20D and in contact with the face 20I of the adjacent cam 20.

Since the washer 26 bears in contact with the over thickness of the face 20I of the adjacent cam, the result is firm fixing by adherence or bonding of the side faces 26G and 26H of the washer 26 with the face 20I of the adjacent cam and with the bottom 20H of the recess 20D. The elements 20 and 26 are thus fixed in rotation. Furthermore, due to cooperation between the shapes of the teeth 26C and 26D and the grooves 22C and 22D, the shaft 22 is efficiently fixed in rotation with the washer-spacer 26 and at the same time the shaft 22 and the cam 20. Therefore, the elements 22C, 22D, 26C and 26D form complementary relief fixing the shaft 22 and the washer-spacer 26 together in rotation, and enabling the transmission of torque between them.

The risks of an angular shift of one or several cams 20 with respect to the shaft 22 are thus avoided as long as the force $F_3$ is applied.

The different washers 26 enable a sort of "secondary resistance" of the fixing torque due to the force $F_3$ at each of the cams in which there is a recess 20D. Compared to a machine according to prior art in which the fixing torque by bonding between two cams is approximately equal to the total bond torque due to the axial tightening force divided by the number of cams, the recesses 20D make it possible to obtain a fixing torque approximately equal to the total torque due to the axial tightening force, at each cam arranged between two washers 26 fixed to the shaft 22 in rotation.

Figure 8:
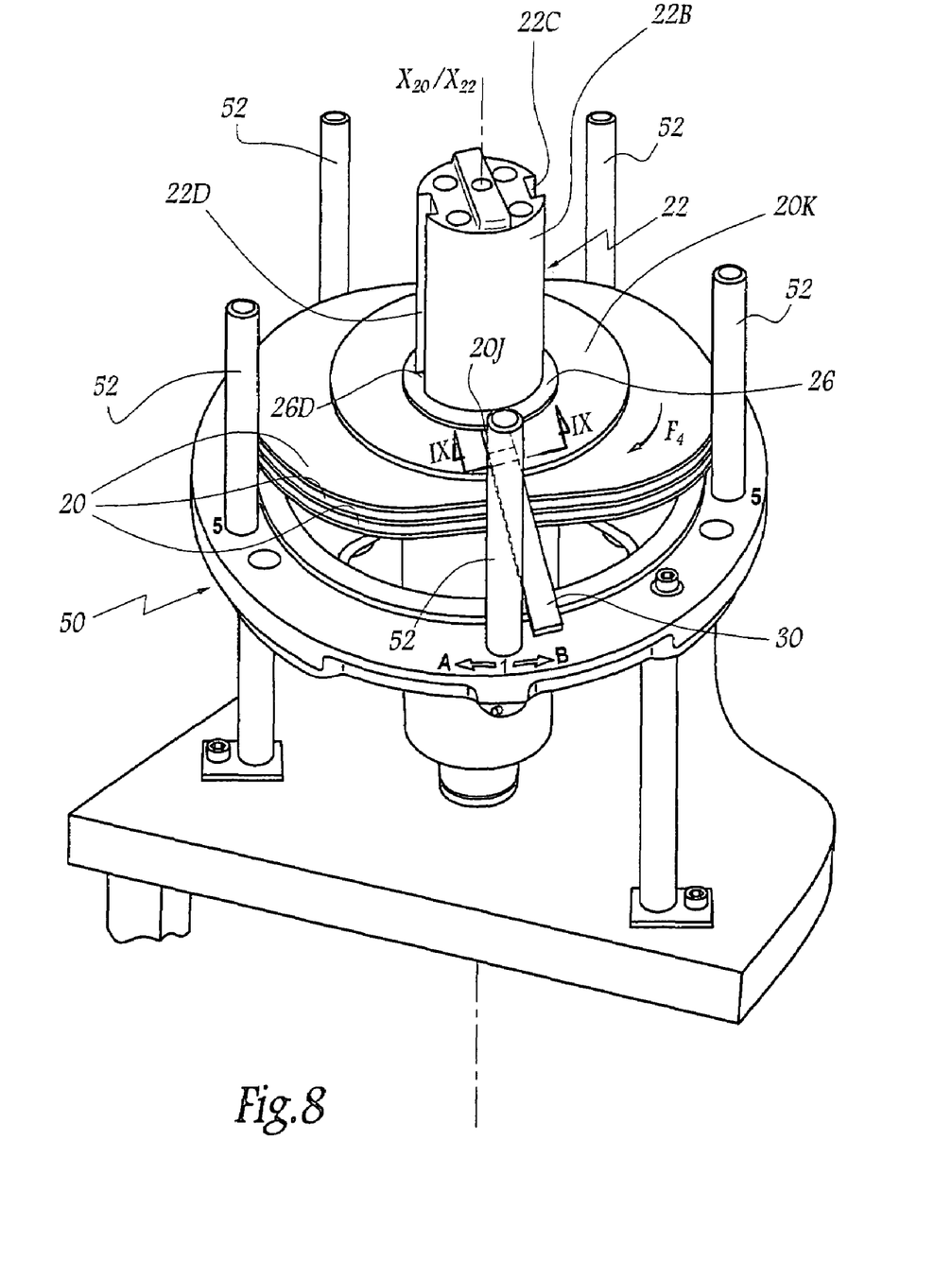
FIG. 8 shows a perspective view of the machine in the previous figures during assembly.

Each cam 20 is provided with a groove 20J on its surface 20E that extends globally along a radial direction from the axis $X_{20}$ and in which a gauge 30 will be fitted as shown in FIG. 8. The groove 20J is formed in an over thickness 20K with a circular cam section and extends from close to the recess 20D to the outside edge of this over thickness.

During assembly of the machine 10, each cam 20 is arranged around the shaft 22 and a gauge 30 is then put into place in the corresponding groove 20J, while a washer 26 is installed in the recess 20D of the cam 20, by sliding the teeth 26C and 26D in the grooves 22C and 22D, which is possible due to the geometry of these projections. The part of the gauge 30 that projects radially from tracks 20A and 20B of the cam is then brought in contact with one or several stops 52 forming part of a positioning template 50 of the shaft 22 and the cams 20. When the gauge 30 is brought into contact with a stop 52, while the gauge remains in place in the corresponding groove 20J, the cam 20 is made to pivot around the $X_{22}$ axis as shown by the arrow $F_4$ so that the cam can be oriented with respect to the shaft 22. The fact that the gauges 30 of the different cams 20 are brought one after the other in contact with one of the stops 52 provides a means of adjusting the relative orientation of the cams 20 with respect to each other as a function of the required harness movement.

Only one gauge 30 is shown in FIG. 8, so as to make the drawing clearer. In practice, there is one gauge for each cam 20.

When the different cams 20 have been put into position along the shaft 22 and they have been adjusted in angle by bringing their corresponding gauges in contact with one of the stops 52, these cams are fixed with respect to the shaft 22 and with respect to each other, by putting the device 29 into place and tightening its screws so as to apply the force $F_3$ that firmly fixes the cams as mentioned above. The gauges 30 are then removed, by pulling them from the corresponding groove 20J in the radial direction about the $X_{20}$ and $X_{22}$ axes. The thickness of the gauges 30 is chosen such that each gauge 30 projects slightly outside the groove 20J in which it is inserted, above the surface 20E over a height h less than the clearance J when a washer 26 is placed in the recess 20D.

Figure 9:
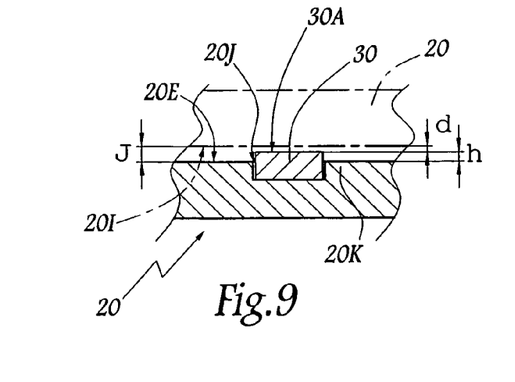
FIG. 9 is a larger scale partial sectional view along line IX-IX in FIG. 8.

FIG. 9 shows a cam 20 superposed on the cam on which the gauge in FIG. 8 is fitted, in chain dotted lines. The distance between the face 30A of the gauge 30 that is parallel to the face 20E and opposite the bottom of the groove 20J and the face 20I of the adjacent cam, is denoted d. The clearance J is equal to the sum of d and h. The geometry of the cams 20 is chosen such that if there is no washer-spacer 26 and when the force $F_3$ is applied, the clearance J tends to be equal to a value J' less than the height h.

Thus, if a washer-spacer 26 is inserted in the recess of the corresponding cam 20, the gauge 30 is not in contact with the surface 20I of the adjacent cam, which enables withdrawal of the gauge 30, even once the force $F_3$ has been applied, by sliding along the longitudinal direction of the groove 20J. On the other hand, if the operator has forgotten the washer 26, the force $F_3$ has the effect of bringing the gauge 30 firmly into contact with the surface 20I of the adjacent cam, which has the effect of jamming the gauge 30. The operator can then immediately detect that one of the washer-spacers is missing.

As shown in FIG. 2, the faces 20E of two adjacent cams 20 may be arranged facing each other, their recesses 20D and the associated washers-spacers then facing each other. These washers 26 then bear in contact with each other and are fixed in rotation under the effect of the force $F_3$.

The recess(s) 20D is (are) made by machining the face 20E of each cam concerned. They can also be made when the cam is being molded. As a variant, the blank for the recess is made when casting and the recess definition faces, namely its bottom 20H and its edge 20F, are machined when the cam is being finished.

Figure 10:
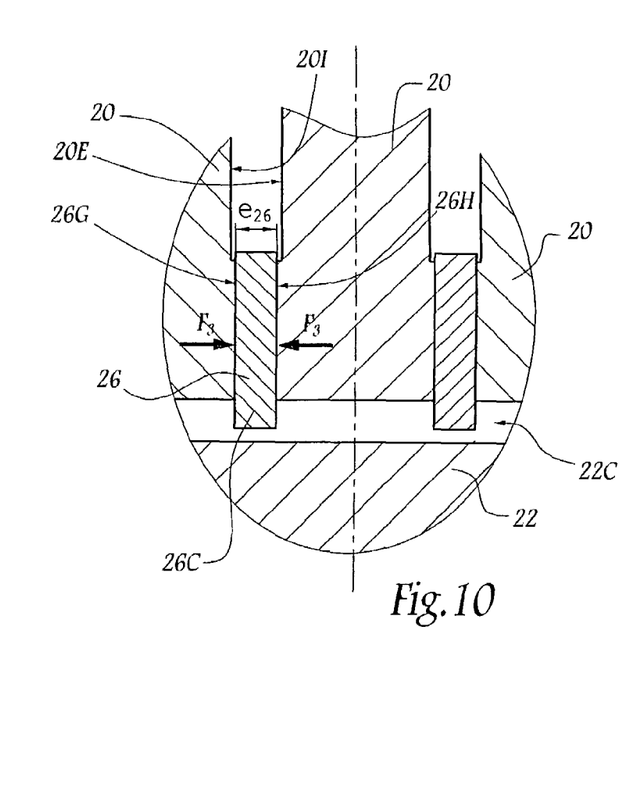
FIG. 10 is a view similar to FIG. 3 for a machine according to a second embodiment of the invention.

In a second embodiment of the invention shown in FIG. 10, elements similar to the elements in the first embodiment are marked with the same references. The cams 20 shown partially in this Figure are not provided with any recesses, the washer-spacer 26 being compressed by the axial tightening force $F_3$ between the opposite faces 20E and 20I of these cams. In the example shown, the surfaces 20E and 20I are each provided with an annular over thickness with an outside diameter slightly smaller than the outside diameter of the ring 26. However, this is not compulsory and the faces 20E and 20I can be completely plane.

As above, the drive torque from shaft 22 is transmitted to the washer 26 because its teeth, one of which is marked with reference 26C, are engaged in the grooves of the shaft 22, one of which is marked with reference 22C. The torque is transmitted from the washer-spacer 26 to cams 20 by bonding between the side faces 26G and 26H of the washer 26 and the corresponding surfaces 20E and 20I of the cams 20 bearing in contact with the washer under the effect of the force $F_3$.

During assembly of the machine, gauges like the gauges 30 are used, each of the cams 20 are provided with a groove of the same type as groove 20J. If there is no recess on the cams, care is taken to assure that the thickness of the part of these gauges that project from the grooves is less than the thickness $e_{26}$ of the corresponding washer-spacer 26.

The invention is not limited to the embodiments described and it can be improved or modified within the scope defined by the appended claims. For example, a recess could be provided on each of the side faces of a cam. The groove 20J could be formed on the face opposite the face on which the recess is fitted.

The invention claimed is:

1. A cam motion mechanism for a weaving loom, said mechanism comprising at least two cams each defining at least one running track for a follower roller, each cam being provided with a center bore through which a drive shaft extends, tightening means for applying a tightening force to said cams parallel to said drive shaft, a section of said shaft being non-circular in cross section, at least one washer-spacer mounted about and being axial movable relative to said shaft when said tightening force is not applied and having an internal edge which is non-circular so as to fix said washer-spacer to rotate with said shaft, and said washer-spacer bearing into firm abutting contact with at least one of said cams upon application of the tightening force to thereby fix, by compressive adherance, said at least one of said cams and said washer-spacer so that said at least one of said cams rotates with said drive shaft.

2. The cam motion mechanism according to claim 1, wherein said washer-spacer is positioned relative to said shaft and said at least one of said cams to be compressed, under the effect of said tightening force, between two cams.

3. The cam motion mechanism according to claim 1, wherein said one of said cams on which said washer-spacer bears is provided with a recess in which said washer-spacer fits, said recess being on a side face of said one of said cams which is perpendicular to said at least one running track thereof.

4. The cam motion mechanism according to claim 3, wherein an assembly formed from said washer-spacer in said recess of said one of said cams is 12 mm thick.

5. The cam motion mechanism according to claim 4, wherein a face of said washer-spacer positioned in said recess extends to a distance of 6 mm from a median plane of said one of said cams.

6. The cam motion mechanism according to claim 3, wherein each cam is provided with a recess and a washer-spacer engaged around said shaft is placed in each recess.

7. The cam motion mechanism according to claim 1, wherein said central bore is at least partly circular, said section of said drive shaft is inscribed within a circular envelope with a radius less than a radius of said bore, said drive shaft including at least one area recessed with respect to said circular envelope, and said internal edge of said at least one washer-spacer including at least one projection that engages within said at least one recessed area.

8. The cam motion mechanism according to claim 7, wherein at least one edge of said at least one projection is generally complementary to one edge of said at least one recessed area.

9. A weaving loom comprising at least one heddle frame connected to an oscillating lever that is controlled in movement by a cam motion mechanism, said cam motion mechanism including at least two cams each defining at least one running track for a follower roller connected to said oscillating lever, each cam being provided with a center bore through which a drive shaft extends, tightening means for applying a tightening force to said cams parallel to said drive shaft, a section of said shaft being non-circular in cross section, at least one washer-spacer mounted about and being axial movable relative to said shaft when said tightening force is not applied and having an internal edge which is non-circular so as to fix said washer-spacer to rotate with said shaft, and said washer-spacer bearing into firm abutting contact with at least one of said cams upon application of the tightening force to thereby fix, by compressive adherance, said at least one of said cams and said washer-spacer so that said at least one of said cams rotates with said drive shaft.

10. A washer-spacer for a cam motion mechanism for a loom, said washer-spacer being flat with a constant thickness and provided with a non-circular internal edge which defines an opening in said washer spacer that enables an axial displacement of said washer-spacer along a drive shaft which drives cams of said cam motion mechanism, and at least one projection extending from said internal edge to fix said washer-spacer in rotation with said shaft, the washer-spacer being adapted to be forced into contact with at least one cam of said cam motion mechanism under the effect of a tightening force directed parallel to said shaft.

11. A cam for a cam motion mechanism for a loom, said cam defining at least one running track for a follower roller associated with a control lever of the loom and a center bore for allowing said cam to be mounted on a drive shaft, said cam being provided with a recess that runs along an edge of said bore and which is in open communication with said bore, and said recess being of a size and configuration to receive a washer-spacer arranged around said drive shaft, when said cam is mounted on said drive shaft.

12. The cam according to claim 11, including a groove on at least one side face thereof which is perpendicular to said at least one running track, said groove extending globally about said bore.

13. A method of assembly of a cam motion mechanism on a drive shaft of a loom wherein said cam motion mechanism includes at least two cams each defining at least one running track for a follower roller connected to an oscillating lever of the loom and wherein each cam is provided with a center bore through which the drive shaft extends and wherein tightening means are provided for applying a tightening force to the cams parallel to the drive shaft and wherein a section of the drive shaft is non-circular in cross section and wherein at least one washer-spacer is mounted about and is axial movable relative to the drive shaft when said tightening force is not applied and has an internal edge which is non-circular so as to fix the washer-spacer to rotate with the drive shaft, the method including the steps of:
 a) sliding each cam along the drive shaft until it reaches approximately a predetermined position along the drive shaft;
 b) placing at least one washer-spacer around the drive shaft close to at least one of the cams;
 c) rotating each cam with respect to the drive shaft to thereby orient each cam in a desired orientation with respect to the drive shaft, and
 d) fixing the cams in position with respect to the drive shaft and other cams, by applying a tightening force to the cams and the at least one washer-spacer parallel to the drive shaft so that the cams are driven to rotate with the drive shaft by compressive adherence applied thereto by the at least one washer-spacer.

14. The method according to claim 13, including the additional steps of:
 e) engaging a gauge in a groove formed in a side face of at least one cam, so as to project radially outwardly relative to the at least one running track; and
 f) during step c), each cam having a groove is oriented by moving the gauge engaged in the groove to bear in contact with a fixed stop.

15. A method according to claim 14, wherein, when a washer-spacer is placed between two adjacent cams, the gauge engaged in the groove in one of the cams is at a distance (d) from the face opposite the other cam, and when there is no washer-spacer, the gauge contacts the opposite face under the effect of the tightening force.

16. A method of assembly of a cam motion mechanism to a loom wherein the mechanism includes a washer-spacer that is flat with a constant thickness and which is provided with a non-circular internal edge which defines an opening in the washer-spacer that enables an axial displacement of the washer-spacer along a drive shaft which drives cams of the mechanism, and that includes at least one projection extending from the internal edge to fix the washer-spacer in rotation with the shaft and a cam defining at least one running track for a follower roller associated with a control lever of the loom and a center bore for allowing the cam to be mounted on the drive shaft, the cam being provided with a recess that runs along the edge of the bore and which is in open communication with the bore and wherein the recess is of a size and configuration to receive the washer-spacer arranged around the drive shaft, when the cam is mounted on the drive shaft, the method including the steps of:
 a) sliding each cam along the drive shaft until it reaches approximately a predetermined position and along the drive shaft;
 b) placing at least one washer-spacer around the drive shaft, so as to be rotatable therewith, in contact with at least one of the cams;
 c) rotatably orienting each cam with respect to the drive shaft, and
 d) fixing the cams in position with respect to the drive shaft and with respect to one another by applying a tightening force on the cams and the at least one washer-spacer parallel to the drive shaft.

17. The method according to claim 16 including the additional steps of:
 e) engaging a gauge in a groove formed on a side face of at least one cam so as to extend radially outwardly of the at least one running track thereof, while
 during step c, each cam having a groove is oriented by bringing the gauge engaged in the groove to bear in contact with a fixed stop.

18. A method according to claim 17, wherein when the at least one washer-spacer is arranged between two adjacent cams, the gauge engaged in the groove in one of these cams is at a distance (d) from the face opposite the other cam, while when there is no washer-spacer, said gauge bears in contact with the opposite face under the effect of the tightening force.

* * * * *